(12) United States Patent
Xiang et al.

(10) Patent No.: US 10,972,199 B2
(45) Date of Patent: Apr. 6, 2021

(54) RSSI MEASUREMENT METHOD, NETWORK DEVICE, AND TERMINAL DEVICE

(71) Applicant: Huawei Technologies Co., Ltd., Shenzhen (CN)

(72) Inventors: Zhengzheng Xiang, Shanghai (CN); Jun Luo, Shanghai (CN); Jin Liu, Shenzhen (CN); Lei Huang, Shanghai (CN); Pu Yuan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 16/110,983

(22) Filed: Aug. 23, 2018

(65) Prior Publication Data

US 2019/0081714 A1 Mar. 14, 2019

Related U.S. Application Data

(63) Continuation of application No. PCT/CN2018/085163, filed on Apr. 28, 2018.

(30) Foreign Application Priority Data

Sep. 8, 2017 (CN) .......................... 201710807561.6

(51) Int. Cl.
*H04W 24/10* (2009.01)
*H04W 56/00* (2009.01)
(Continued)

(52) U.S. Cl.
CPC .......... *H04B 17/318* (2015.01); *H04W 24/10* (2013.01); *H04W 56/001* (2013.01); *H04W 72/042* (2013.01); *H04W 72/0446* (2013.01)

(58) Field of Classification Search
CPC ........ H04B 17/318; H04B 17/24; H04B 7/26; H04B 7/2621; H04W 56/001; H04W 72/042; H04W 72/0446
See application file for complete search history.

(56) References Cited

U.S. PATENT DOCUMENTS

2010/0309797 A1 12/2010 Lindoff et al.
2013/0033998 A1* 2/2013 Seo ...................... H04J 11/0056
370/252
(Continued)

FOREIGN PATENT DOCUMENTS

CN 101409902 A 4/2009
CN 101420723 A 4/2009
(Continued)

OTHER PUBLICATIONS

3GPP TS 138.331, 5G, NR Protocol specification, Version 15.3.0 (Year: 2018).*
(Continued)

*Primary Examiner* — Un C Cho
*Assistant Examiner* — Peter K Mak

(57) ABSTRACT

An RSSI measurement method, a network device, and a terminal device are disclosed. The method includes receiving, by a terminal device, an RSSI measurement configuration message, where the measurement configuration message includes indication information of a time resource for RSSI measurement, and the time resource includes first downlink symbols and second downlink symbols in a timeslot in which a synchronization signal block is located, and measuring a received signal power on the first downlink symbols and the second downlink symbols, where the first downlink symbols include downlink symbols in which the synchronization signal block is located, and where the
(Continued)

second downlink symbols include at least one downlink symbol other than the first downlink symbols.

8 Claims, 11 Drawing Sheets

(51) Int. Cl.
*H04W 72/04* (2009.01)
*H04B 17/318* (2015.01)

(56) References Cited

U.S. PATENT DOCUMENTS

| | | | |
|---|---|---|---|
| 2015/0092582 A1 | 4/2015 | Liao et al. | |
| 2015/0230206 A1* | 8/2015 | Tabet | H04W 72/02 370/329 |
| 2015/0264686 A1 | 9/2015 | Kim et al. | |
| 2015/0312789 A1 | 10/2015 | You et al. | |
| 2015/0358094 A1 | 12/2015 | Yi et al. | |
| 2016/0302230 A1 | 10/2016 | Novlan et al. | |
| 2016/0302330 A1 | 10/2016 | Novlan et al. | |
| 2019/0007147 A1 | 1/2019 | Li et al. | |
| 2019/0037605 A1* | 1/2019 | Agiwal | H04W 74/0833 |
| 2019/0052379 A1* | 2/2019 | Lin | H04L 5/0082 |
| 2019/0149253 A1* | 5/2019 | Yoon | H04W 24/10 370/252 |
| 2019/0230580 A1* | 7/2019 | Kim | H04L 5/0051 |
| 2019/0281633 A1* | 9/2019 | Ahn | H04W 52/367 |
| 2019/0363809 A1* | 11/2019 | Yoon | H04W 56/00 |

FOREIGN PATENT DOCUMENTS

| | | |
|---|---|---|
| CN | 104662944 A | 5/2015 |
| CN | 104981994 A | 10/2015 |
| CN | 105307190 A | 2/2016 |
| CN | 105743591 A | 7/2016 |
| CN | 105846921 A | 8/2016 |
| CN | 106233647 A | 12/2016 |
| WO | 2017075795 A1 | 5/2017 |

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211 V14.3.0, Jun. 2017, 195 pages.

"3rd Generation Partnership Project; Technical Specification Group Radio Access Network; NR; Physical layer measurements (Release 15)," 3GPP TS 38.215 V0.1.2, Aug. 2017, 10 pages.

"Measurement Based on SS Block," Agenda Item: 6.1.1.5.1, Source: Huawei, HiSilicon, Document for: Discussion and Decision, 3GPP TSG RAN WG1 Meeting #90, R1-1713777, Prague, Czech Republic, Aug. 21-25, 2017, 3 pages.

"Discussion on signal quality measurements for NR," Source: CMCC, Agenda Item: 6.1.1.5.1, Document for: Discussion, 3GPP TSG RAN WG1 Meeting #90, R1-1714222, Prague, P.R. Czechia, Aug. 21-25, 2017, 4 pages.

* cited by examiner

RSSI MEASUREMENT METHOD, NETWORK DEVICE, AND TERMINAL DEVICE

CROSS-REFERENCE TO RELATED APPLICATIONS

This application is a continuation of International Application No. PCT/CN2018/085163, filed on Apr. 28, 2018, which claims priority to Chinese Patent Application 201710807561.6, filed on Sep. 8, 2017. The disclosures of the aforementioned applications are hereby incorporated by reference in their entireties.

TECHNICAL FIELD

This application relates to the field of communications technologies, and in particular, to a received signal strength indicator (RSSI) measurement method, a network device, and a terminal device.

BACKGROUND

A multi-beam transmission technology is used in a new radio (NR) communications system. To support a multi-beam feature of the NR, a synchronization signal burst set (SS block burst set) is defined in the NR. The synchronization signal burst set includes one or more synchronization signal blocks (SS block), and a network device may separately send these synchronization signal blocks by using different beams, thereby implementing beam scanning. In different frequency ranges, a maximum quantity L of synchronization signal blocks that can be included in the synchronization signal burst set varies. Specifically, when a frequency does not exceed 3 GHz, L=4; when a frequency is between 3 GHz and 6 GHz, L=8; or when a frequency is between 6 GHz and 52.6 GHz, L=64.

The network device periodically sends the synchronization signal block, and a maximum of L synchronization signal blocks included in the synchronization signal burst set (a quantity of actually sent synchronization signal blocks may be less than L) need to be sent in a 5 millisecond time window.

Reference signal received quality (RSRQ) is a value reflecting reference signal received quality of a terminal device. The terminal device obtains a reference signal received power (RSRP) and an RSSI through measurement, to obtain the RSRQ. Therefore, RSSI measurement is very important for obtaining the RSRQ.

In the prior art, the terminal device obtains the RSSI by measuring all symbols in the 5 millisecond time window including the synchronization signal burst set. This causes relatively high measurement complexity and power overheads particularly when a synchronization signal block sending period is relatively small.

Therefore, a current problem of relatively high complexity and power overheads of RSSI measurement needs to be resolved urgently.

SUMMARY

This application provides an RSSI measurement method, a network device, and a terminal device, to reduce complexity and power overheads of RSSI measurement while ensuring precision of the RSSI measurement.

According to one aspect of this application, an RSSI measurement method is provided. The method includes sending, by a network device, a synchronization signal block, and sending, by the network device, a received signal strength indicator RSSI measurement configuration message, where the measurement configuration message includes indication information of a time resource for RSSI measurement, and the time resource includes first downlink symbols and second downlink symbols in a timeslot in which the synchronization signal block is located, the first downlink symbols include downlink symbols in which the synchronization signal block is located, and the second downlink symbols include at least one downlink symbol other than the first downlink symbols. In this implementation, the network device notifies the terminal device of the indication information of the time resource for the RSSI measurement, so that the terminal device measures a received signal power on the downlink symbols in which the synchronization signal block is located and/or a received signal power on other several downlink symbols by using a transmit beam for each synchronization signal block, thereby reducing complexity and power overheads of the measurement performed by the terminal device while considering precision of the RSSI measurement.

In a possible implementation, the time resource includes first downlink symbols and second downlink symbols in a timeslot in which an actually sent synchronization signal block is located. In this implementation, although the network device presets locations of a maximum quantity of synchronization signal blocks in a timeslot, a quantity of synchronization signal blocks actually sent by the network device may be less than the maximum quantity.

In another possible implementation, the time resource includes first downlink symbols and second downlink symbols in a timeslot in which N synchronization signal blocks are located, and N is a positive integer greater than or equal to 1. In this implementation, the RSSI measurement is configured based on the timeslot.

In still another possible implementation, the time resource includes first downlink symbols and second downlink symbols in two timeslots in which a synchronization signal block is located. In this implementation, the synchronization signal block may cross timeslots. Therefore, the corresponding time resource for the RSSI measurement also needs to cross the timeslots.

In still another possible implementation, the time resource includes first downlink symbols in which a synchronization signal block is located and second downlink symbols corresponding to the synchronization signal block. In this implementation, the RSSI measurement is configured based on the symbol.

In still another possible implementation, the first downlink symbols and the second downlink symbols are located in a same timeslot or different timeslots.

In still another possible implementation, second downlink symbols corresponding to synchronization signal blocks are the same or different. In this implementation, second downlink symbols corresponding to different synchronization signal blocks may be the same or different.

In still another possible implementation, if a reference signal received power RSRP of the synchronization signal block is greater than or equal to a first threshold, the terminal device measures a received signal power on the first downlink symbols and the second downlink symbols. In this implementation, when the received signal power on the downlink symbols in which the synchronization signal block is located and/or the received signal power on the second downlink symbol is measured, the RSRP of the synchronization signal block needs to be greater than or equal to a preset threshold.

In still another possible implementation, the measurement configuration message further includes indication information of a frequency resource for the RSSI measurement, and the method further includes: obtaining, by the terminal device, RSRQ through calculation based on the following formula:

$$RSRQ = \frac{N \cdot a \cdot RSRP}{RSSI}$$

where N is a quantity of resource blocks included in the frequency resource for the RSSI measurement, a is a specified coefficient, and RSRP is the reference signal received power. In this implementation, the RSRQ may be obtained through calculation based on the measured RSSI and RSRP, and the RSRQ is a value reflecting received quality of the terminal device.

In still another possible implementation, the measurement configuration message further includes the specified coefficient a. In this implementation, the specified coefficient a may be carried in the measurement configuration message.

In still another possible implementation, the first downlink symbols and the second downlink symbols are located in a synchronization signal burst set.

In still another possible implementation, the indication information of the frequency resource is used to indicate a frequency band that needs to be measured for the RSSI, and the frequency band includes one or more continuous resource blocks.

In still another possible implementation, the indication information of the frequency resource includes a sequence number of a start resource block and a quantity of the resource blocks.

In still another possible implementation, the measured frequency band includes at least a frequency band in which the synchronization signal block is located.

Correspondingly, another aspect of this application further provides a communications apparatus, to implement the foregoing RSSI measurement method. For example, the communications apparatus may be a chip (for example, a baseband chip or a communications chip) or a device (for example, a network device or a baseband processing board). The foregoing method may be implemented by using software or hardware, or by using hardware to execute corresponding software.

In a possible implementation, a structure of the communications apparatus includes a processor and a memory. The processor is configured to support the apparatus to perform a corresponding function in the foregoing RSSI measurement method. The memory is configured to couple to the processor, and the memory stores a necessary program (an instruction) and data of the apparatus. Optionally, the communications apparatus may further include a communications interface configured to support the apparatus to communicate with another network element.

In another possible implementation, the communications apparatus may include a sending unit. The sending unit is configured to implement a sending function in the foregoing method. For example, the sending unit is configured to send the synchronization signal block, and is configured to send the received signal strength indicator RSSI measurement configuration message.

When the communications apparatus is a chip, the sending unit may be an output unit such as an output circuit or a communications interface. When the communications apparatus is a device, the sending unit may be a transmitter (may also be referred to as a transmitter machine).

Based on an inventive concept the same as that of the foregoing method, for a principle for resolving the problem and beneficial effects of the apparatus, refer to the foregoing possible method implementations of the terminal device and their beneficial effects. Therefore, for implementation of the apparatus, refer to the implementation of the method, and repetitions are not described herein again.

According to another aspect of this application, an RSSI measurement method is provided. The method includes receiving, by a terminal device, a received signal strength indicator RSSI measurement configuration message, where the measurement configuration message includes indication information of a time resource for RSSI measurement, and the time resource includes first downlink symbols and second downlink symbols in a timeslot in which a synchronization signal block is located, receiving, by the terminal device, the synchronization signal block, and measuring, by the terminal device, a received signal power on the first downlink symbols and/or the second downlink symbols, where the first downlink symbols include downlink symbols in which the synchronization signal block is located, and the second downlink symbols include at least one downlink symbol other than the first downlink symbols. In this implementation, the received signal power on the downlink symbols in which the synchronization signal block is located and/or the received signal power on other several downlink symbols is measured by using a transmit beam for each synchronization signal block, thereby reducing complexity and power overheads of the measurement performed by the terminal device while considering precision of the RSSI measurement.

In a possible implementation, the time resource includes first downlink symbols and second downlink symbols in a timeslot in which an actually sent synchronization signal block is located. In this implementation, although the network device presets locations of a maximum quantity of synchronization signal blocks in a timeslot, a quantity of synchronization signal blocks actually sent by the network device may be less than the maximum quantity.

In another possible implementation, the time resource includes first downlink symbols and second downlink symbols in a timeslot in which N synchronization signal blocks are located, and N is a positive integer greater than or equal to 1. In this implementation, the RSSI measurement is configured based on the timeslot.

In still another possible implementation, the time resource includes first downlink symbols and second downlink symbols in two timeslots in which a synchronization signal block is located. In this implementation, the synchronization signal block may cross timeslots. Therefore, the corresponding time resource for the RSSI measurement also needs to cross the timeslots.

In still another possible implementation, the time resource includes first downlink symbols in which a synchronization signal block is located and second downlink symbols corresponding to the synchronization signal block. In this implementation, the RSSI measurement is configured based on the symbol.

In still another possible implementation, the first downlink symbols and the second downlink symbols are located in a same timeslot or different timeslots.

In still another possible implementation, second downlink symbols corresponding to synchronization signal blocks are the same or different. In this implementation, second downlink symbols corresponding to different synchronization signal blocks may be the same or different.

In still another possible implementation, if a reference signal received power RSRP of the synchronization signal block is greater than or equal to a first threshold, the terminal device measures a received signal power on the first downlink symbols and the second downlink symbols. In this implementation, when the received signal power on the downlink symbols in which the synchronization signal block is located and the received signal power on the second downlink symbol is measured, the RSRP of the synchronization signal block needs to be greater than or equal to a preset threshold.

In still another possible implementation, the measurement configuration message further includes indication information of a frequency resource for the RSSI measurement, and the method further includes obtaining, by the terminal device, RSRQ through calculation based on the following formula:

$$RSRQ = \frac{N \cdot a \cdot RSRP}{RSSI}$$

where N is a quantity of resource blocks included in the frequency resource for the RSSI measurement, a is a specified coefficient, and RSRP is the reference signal received power. In this implementation, the RSRQ may be obtained through calculation based on the measured RSSI and RSRP, and the RSRQ is a value reflecting received quality of the terminal device.

In still another possible implementation, the measurement configuration message further includes the specified coefficient a. In this implementation, the specified coefficient a may be carried in the measurement configuration message.

In still another possible implementation, the first downlink symbols and the second downlink symbols are located in a synchronization signal burst set.

In still another possible implementation, the indication information of the frequency resource is used to indicate a frequency band that needs to be measured for the RSSI, and the frequency band includes one or more continuous resource blocks.

In still another possible implementation, the indication information of the frequency resource includes a sequence number of a start resource block and a quantity of the resource blocks.

In still another possible implementation, the measured frequency band includes at least a frequency band in which the synchronization signal block is located.

Correspondingly, another aspect of this application further provides a communications apparatus, to implement the foregoing RSSI measurement method. For example, the communications apparatus may be a chip (for example, a baseband chip or a communications chip) or a device (for example, a terminal device). The foregoing method may be implemented by using software or hardware, or by using hardware to execute corresponding software.

In a possible implementation, a structure of the communications apparatus includes a processor and a memory. The processor is configured to support the apparatus to perform a corresponding function in the foregoing RSSI measurement method. The memory is configured to couple to the processor, and the memory stores a necessary program (an instruction) and data of the apparatus. Optionally, the communications apparatus may further include a communications interface configured to support the apparatus to communicate with another network element.

In another possible implementation, the communications apparatus may include a receiving unit and a processing unit. The receiving unit and the processing unit are respectively configured to implement a receiving function and a processing function in the foregoing method. For example, the receiving unit is configured to receive the received signal strength indicator RSSI measurement configuration message and receive the synchronization signal block, and the processing unit is configured to measure the received signal power on the first downlink symbols and on the second downlink symbols.

When the communications apparatus is a chip, the receiving unit may be an input unit such as an input circuit or a communications interface. When the communications apparatus is a device, the receiving unit may be a receiver (may also be referred to as a receiver machine).

Based on an inventive concept the same as that of the foregoing method, for a principle for resolving the problem and beneficial effects of the apparatus, refer to the foregoing possible method implementations of the terminal device and their beneficial effects. Therefore, for implementation of the apparatus, refer to the implementation of the method, and repetitions are not described herein again.

According to another aspect of this application, a processor is provided. The processor includes at least one circuit, configured to control a transmitter to send a synchronization signal block, and control the transmitter to send a received signal strength indicator RSSI measurement configuration message, where the measurement configuration message includes indication information of a time resource for RSSI measurement, and the time resource includes first downlink symbols and second downlink symbols in a timeslot in which the synchronization signal block is located, the first downlink symbols include downlink symbols in which the synchronization signal block is located, and the second downlink symbols include at least one downlink symbol other than the first downlink symbols.

According to another aspect of this application, a processor is provided. The processor includes at least one circuit, configured to control a receiver to receive a received signal strength indicator RSSI measurement configuration message, where the measurement configuration message includes indication information of a time resource for RSSI measurement, and the time resource includes first downlink symbols and second downlink symbols in a timeslot in which a synchronization signal block is located, and control the receiver to receive the synchronization signal block, where the at least one circuit is configured to measure a received signal power on the first downlink symbols and on the second downlink symbols, the first downlink symbols include downlink symbols in which the synchronization signal block is located, and the second downlink symbols include at least one downlink symbol other than the first downlink symbols.

According to another aspect of this application, a computer-readable storage medium is provided. The computer-readable storage medium stores an instruction, and when the instruction is run on a computer, the computer is enabled to perform the method according to the foregoing aspects.

According to another aspect of this application, a computer program product including an instruction is provided, and when the computer program product is run on a computer, the computer is enabled to perform the method according to the foregoing aspects.

BRIEF DESCRIPTION OF THE DRAWINGS

To describe the technical solutions in the embodiments of the present invention or in the background more clearly, the following describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

Figure 1:
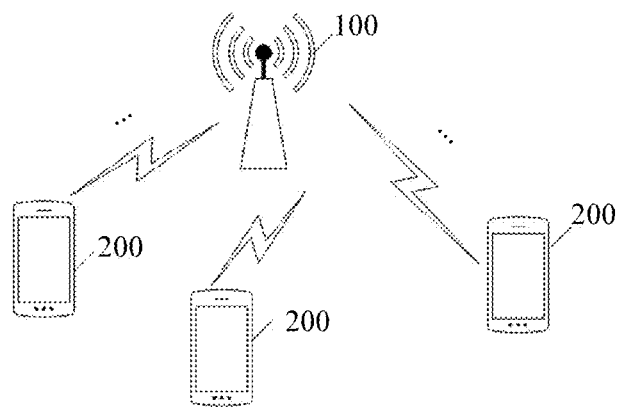
FIG. 1 is a schematic diagram of an example of a communications system according to an embodiment of the present invention.

FIG. 1 is a schematic diagram of a communications system. The communications system may include at least one network device 100 (only one network device 100 is shown) and one or more terminal devices 200 connected to the network device 100.

The network device 100 may be a device that can communicate with the terminal device 200. The network device 100 may be any device having a wireless receiving and sending function. The network device 100 includes but is not limited to a base station (for example, a NodeB, an evolved NodeB (eNodeB), a base station in a 5th generation (5G) in a communications system, a base station or a network device in a future communications system, an access node in a WiFi system, a wireless relay node, or a wireless backhaul node. Alternatively, the network device 100 may be a radio controller in a cloud radio access network (CRAN) scenario. Alternatively, the network device 100 may be a network device in a 5G network or a network device in a future evolved network; or may be a wearable device, an in-vehicle device, or the like. Alternatively, the network device 100 may be a small cell, a transmission/reception point (TRP), or the like. Certainly, this application is not limited thereto.

The terminal device 200 is a device having a wireless receiving and sending function. The device may be deployed on land, including an indoor or outdoor device, a handheld device, a wearable device, or an in-vehicle device, or may be deployed on the water (for example, on a steamer), or may be deployed in the air (for example, on an air plane, a balloon, or a satellite). The terminal device may be a mobile phone (mobile phone), a tablet computer (Pad), a computer having a wireless receiving and sending function, a virtual reality (Virtual Reality, VR) terminal device, an augmented reality (AR) terminal device, a wireless terminal in industrial control, a wireless terminal in a self driving vehicle, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. The terminal device may also be referred to as user equipment (UE), an access terminal device, a UE unit, a UE station, a mobile site, a mobile station, a remote station, a remote terminal device, a mobile device, a UE terminal device, a terminal device, a wireless communications device, a UE agent, a UE apparatus, or the like sometimes.

It should be noted that the terms "system" and "network" may be used interchangeably in the embodiments of the present invention. The term "a plurality of" means two or more than two. In view of this, the term "a plurality of" may also be understood as "at least two" in the embodiments of the present invention. The term "and/or" describes only an association relationship for describing associated objects and represents that three relationships may exist. For example, A and/or B may represent the following three cases: Only A exists, both A and B exist, and only B exists. In addition, unless specifically stated, the character "/" in this specification usually indicates an "or" relationship between the associated objects.

Embodiments of the present invention provide an RSSI measurement method and an apparatus. A received signal power on downlink symbols in which a synchronization signal block (which may be referred to as an SS block or an SS/PBCH block) is located and/or a received signal power on other several downlink symbols is measured by using a transmit beam for each synchronization signal block, thereby reducing complexity and power overheads of the measurement performed by the terminal device while considering precision of RSSI measurement.

Figure 2:
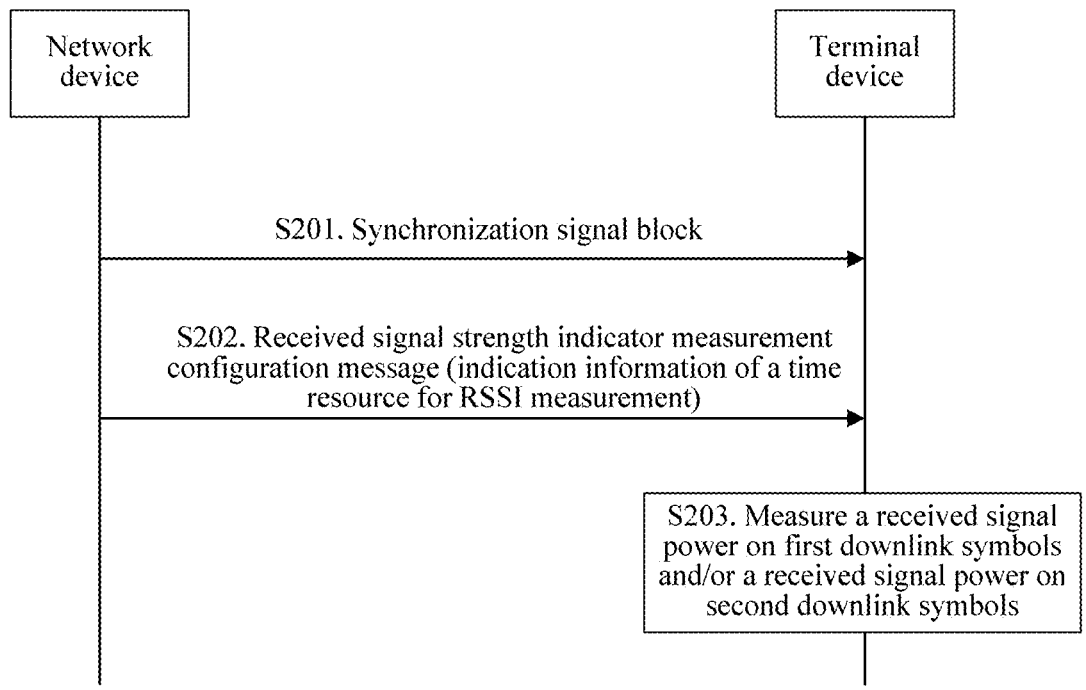
FIG. 2 is a schematic interaction flowchart of an RSSI measurement method according to an embodiment of the present invention.

FIG. 2 is a schematic interaction flowchart of an RSSI measurement method according to an embodiment of the present invention. The method may include the following steps.

S201. A network device sends a synchronization signal block, and a terminal device receives the synchronization signal block.

S202. The network device sends an RSSI measurement configuration message, and the terminal device receives the RSSI measurement configuration message, where the measurement configuration message includes indication information of a time resource for RSSI measurement, the time resource includes first downlink symbols and second downlink symbols in a timeslot in which the synchronization signal block is located, the first downlink symbols include downlink symbols in which the synchronization signal block is located, and the second downlink symbols include at least one downlink symbol other than the first downlink symbols.

S203. The terminal device measures a received signal power on the first downlink symbols and/or the second downlink symbols.

A sequence of sending, by the network device, the synchronization signal block and sending, by the network device, the RSSI measurement configuration message is not limited. That is, the synchronization signal block may be sent before the RSSI measurement configuration message is sent, or the RSSI measurement configuration message may be sent before the synchronization signal block is sent, or the synchronization signal block and the RSSI measurement configuration message may be simultaneously sent.

Figure 3:
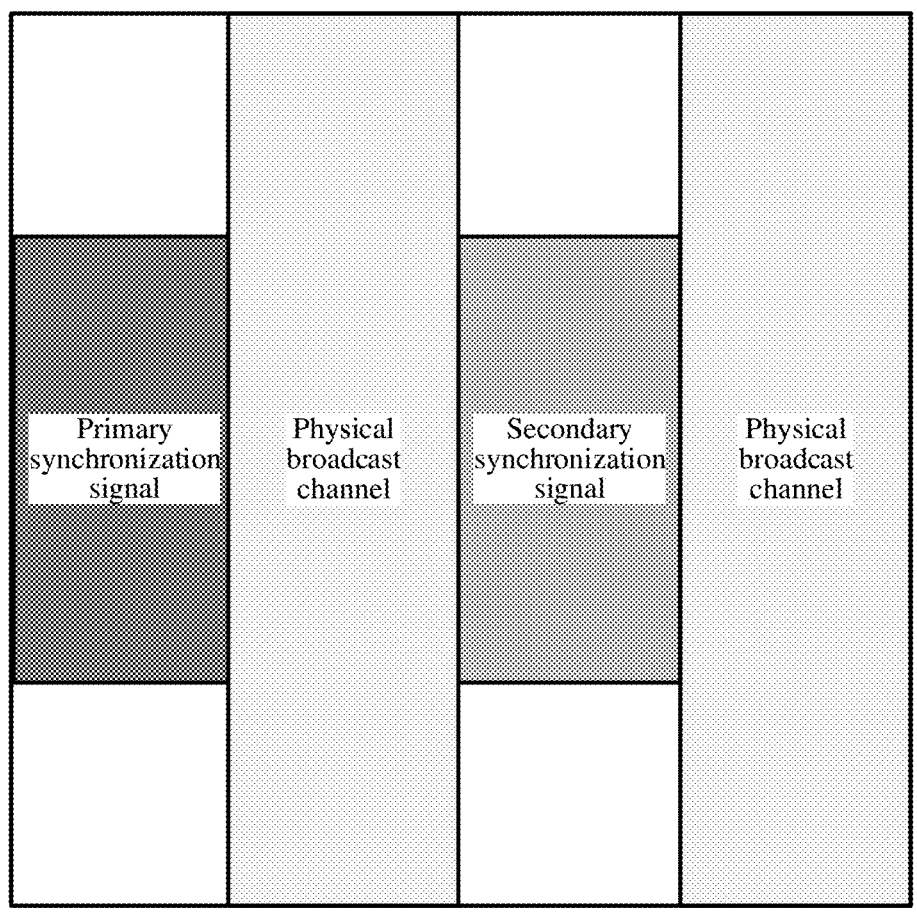
FIG. 3 is a schematic structural diagram of a signal of a synchronization signal block.

FIG. 3 is a schematic structural diagram of a signal of a synchronization signal block. The synchronization signal block includes a primary synchronization signal (PSS), a secondary synchronization signal (SSS), and a physical broadcast channel (PBCH). Main functions of the PSS and the SSS are to help a terminal device identify a cell and synchronize with the cell, and the PBCH includes most basic system information such as a system frame number and intra-frame timing information. The terminal device accesses the cell under the premise that the terminal device successfully receives a synchronization signal block. In a structure of the synchronization signal block shown in FIG. 3, the PSS and SSS separately occupy one orthogonal frequency division multiplexing (OFDM) symbol, the PBCH occupies two OFDM symbols, and a bandwidth occupied by the PBCH is approximately twice a bandwidth occupied by the PSS/SSS.

Figure 4:
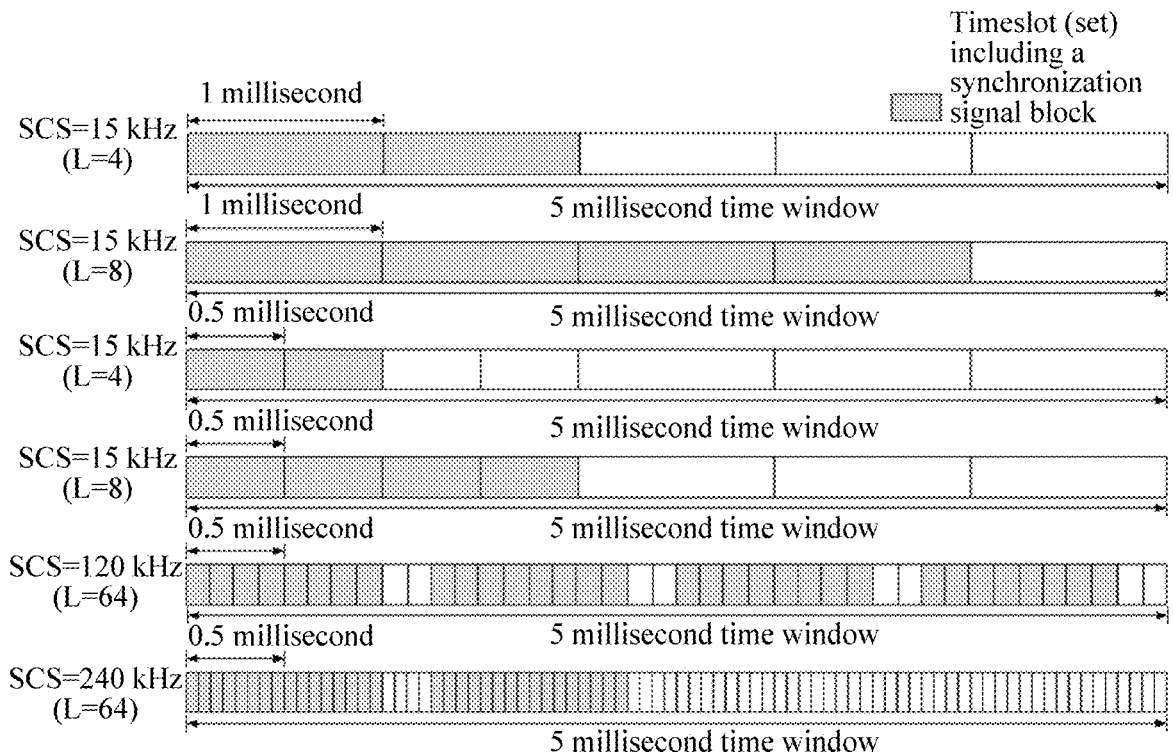
FIG. 4 is a schematic diagram of locations of L synchronization signal blocks in a 5 millisecond time window at different subcarrier spaces.

FIG. 4 is a schematic diagram of locations of L synchronization signal blocks in a 5 millisecond time window at different subcarrier spaces (SCS). It can be learned that when the subcarrier spaces are different, a maximum quantity L of synchronization signal blocks that a synchronization signal burst set can include may vary. In addition, if the subcarrier spaces are the same and frequencies are different, the maximum quantity L of the synchronization signal blocks included in the synchronization signal burst set may also vary. For example, when the SCS=15 kHz, L=4 or L=8, or when the SCS=30 kHz, L=4 or L=8.

Figure 5:
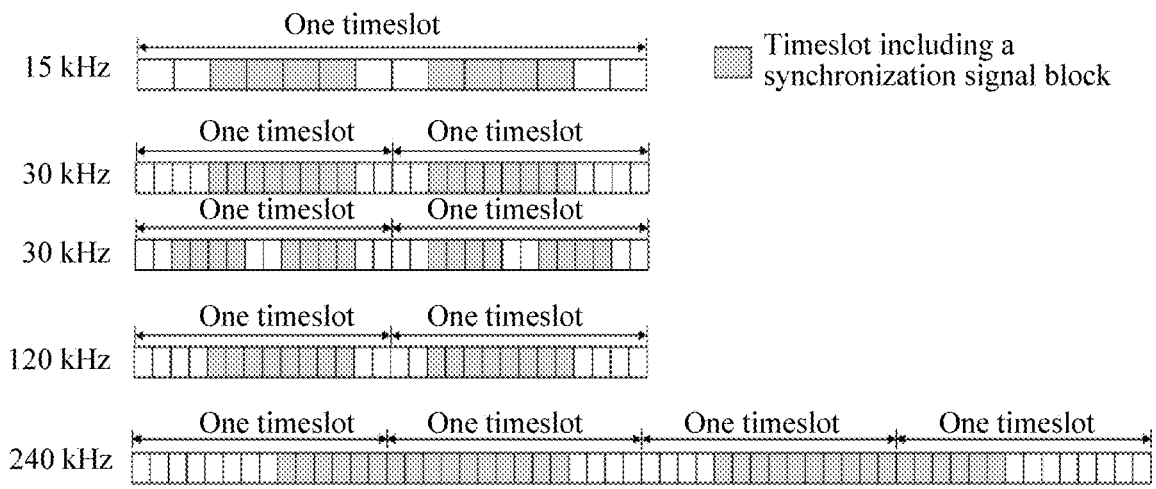
FIG. 5 is a schematic mapping diagram of synchronization signal blocks in a timeslot at different subcarrier spaces.

In addition, a location of the synchronization signal block in a timeslot also varies for different SCSs. FIG. 5 is a schematic mapping diagram of synchronization signal blocks in a timeslot at different SCSs. When an SCS=30 kHz, there are two mapping manners, or when the SCS=240 kHz, the synchronization signal block may be mapped across timeslots.

In this embodiment, a time resource for RSSI measurement that is configured by a network device for a terminal device includes first downlink symbols and second downlink symbols in a timeslot in which a synchronization signal block is located. The first downlink symbols include downlink symbols in which the synchronization signal block is located, and the second downlink symbols include at least one downlink symbol other than the first downlink symbols. The network device sends the synchronization signal block by using a beam. A received signal power on the downlink symbols in which the synchronization signal block is located and/or a received signal power on other several downlink symbols is measured by using a transmit beam for each synchronization signal block. The terminal device does not need to obtain an RSSI by always measuring all symbols in a 5 millisecond time window including a synchronization signal burst set.

Usually, the RSSI is obtained by the terminal device by measuring a total received power on some symbols and then averaging the total received power. In this embodiment, the RSSI is obtained by the terminal device by measuring a received signal power on the first downlink symbols and on the second downlink symbols in the timeslot in which the synchronization signal block is located. It should be noted that the synchronization signal block herein refers to a maximum of L synchronization signal blocks in a synchronization signal burst set. The RSSI is obtained by the terminal device by measuring the received signal power on first downlink symbols and the received signal power on second downlink symbols in a timeslot in which all the synchronization signal blocks are located.

The network device indicates the time resource for the RSSI measurement to the terminal device by using an RSSI measurement configuration message, that is, the measurement configuration message includes the indication information of the time resource for the RSSI measurement. Further, the measurement configuration message may further include indication information of a frequency resource for the RSSI measurement. The indication information of the frequency resource is used to indicate a frequency band that needs to be measured for the RSSI, and the frequency band includes one or more continuous resource blocks. Specifically, the indication information of the frequency resource includes a sequence number of a start resource block and a quantity of the resource blocks. The measured frequency band includes at least a frequency band in which the synchronization signal block is located, and frequency bands in which the synchronization signal blocks are located may be the same or different. The measurement configuration message may be a system message or a broadcast message. For the terminal device in a connected state, the measurement configuration message may alternatively be Radio Resource Control (RRC) signaling.

Figure 6:
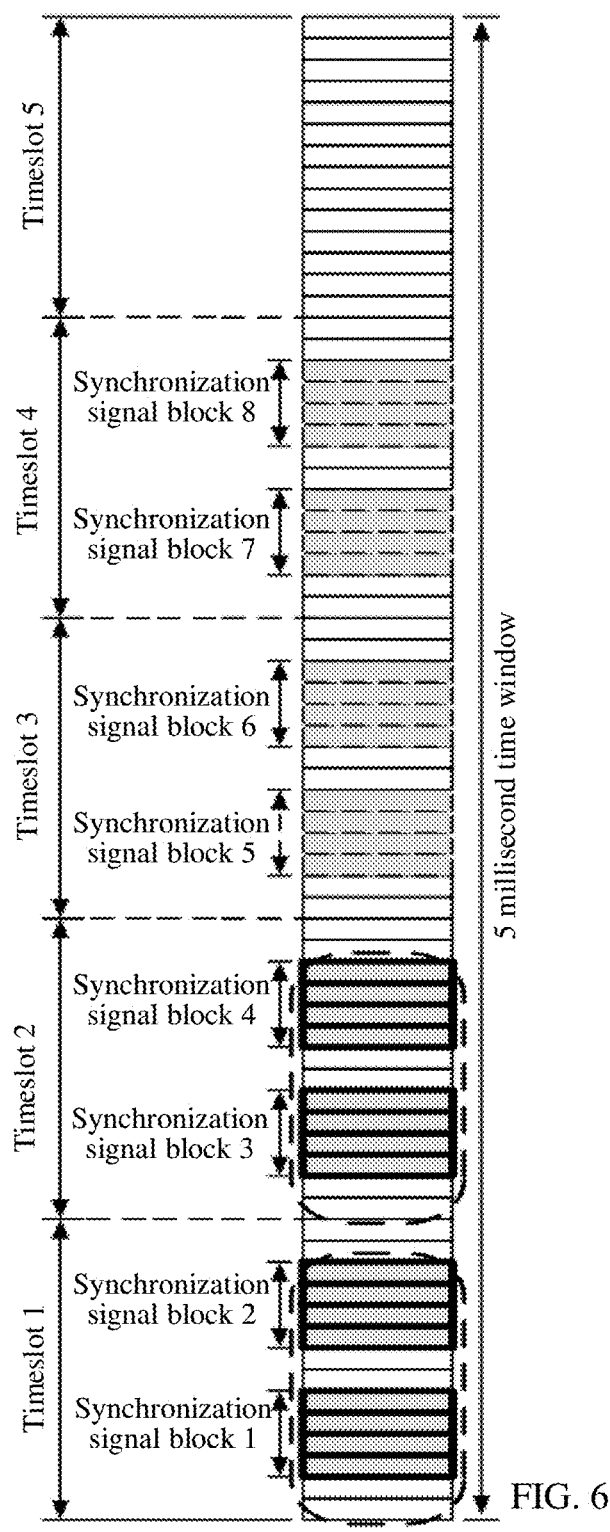
FIG. 6 is a schematic mapping diagram of an example of a synchronization signal block.

It should be noted that in a synchronization signal block sending period, the maximum of L synchronization signal blocks need to be sent in the 5 millisecond time window. In addition, corresponding to any SCS, locations of the L synchronization signal blocks in the timeslot are preset. That is, the time resource for the RSSI measurement includes first downlink symbols and/or second downlink symbols in a timeslot in which an actually sent synchronization signal block is located. Further, the first downlink symbols and the second downlink symbols are located in a synchronization signal burst set. For example, FIG. 6 is a schematic mapping diagram of an example of a synchronization signal block. When an SCS=15 kHz and L=8, it is assumed that a network device actually sends previous four synchronization signal blocks (that is, synchronization signal blocks represented by using bold solid lines, and it should be noted that locations of other synchronization signal blocks are provided herein because locations of a maximum quantity of synchronization signal blocks are preset, and a quantity of synchronization signal blocks actually sent by the network device may be less than the maximum quantity). When measuring an RSSI, a terminal device needs to measure only all downlink symbols in timeslots in which the previous four synchronization signal blocks are located (that is, the downlink symbols in a timeslot 1 and a timeslot 2). This is also similar to a case in which the SCS and the L are other values.

It should be noted that if the network device actually sends $L_1$ synchronization signal blocks, and the terminal device detects only M synchronization signal blocks (M≤$L_1$), the terminal device may measure only RSSIs corresponding to the M synchronization signal blocks. That is, an RSSI corresponding to each synchronization signal block is obtained by measuring all downlink symbols in a timeslot in which the synchronization signal block is located. The terminal device may measure only all the downlink symbols in the timeslot in which each of the actually detected synchronization signal blocks is located. For those synchronization signal blocks that are not sent, the terminal device does not need to measure downlink symbols in a timeslot in which the synchronization signal blocks are located.

Specifically, for RSSI measurement corresponding to each of all the synchronization signal blocks, in an implementation, an RSSI measurement configuration based on the timeslot is considered. Specifically, a time resource for the RSSI measurement includes first downlink symbols and second downlink symbols in a timeslot in which N synchronization signal blocks are located, and N is a positive integer greater than or equal to 1.

Figure 7A:
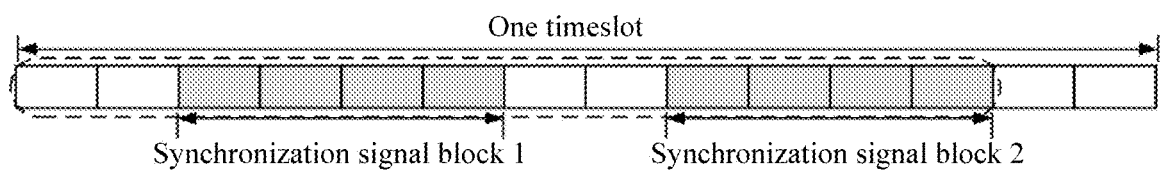
FIG. 7a to FIG. 7c are schematic diagrams of examples of symbols that need to be measured for an RSSI corresponding to a synchronization signal block at different subcarrier spaces.

For example, when the SCS=15 kHz, FIG. 7a is a schematic diagram of symbols that need to be measured for an RSSI corresponding to a synchronization signal block. For a synchronization signal block 1 or 2, symbols that need to be measured for an RSSI corresponding to the synchronization signal block 1 or 2 are symbols in a dashed line box (it is assumed that the last two symbols in the timeslot are uplink symbols). RSSIs corresponding to the synchronization signal block 1 and the synchronization signal block 2 are separately obtained by measuring a received signal power on the symbols in the dashed line box. Herein, the RSSIs corresponding to the synchronization signal block 1 and the synchronization signal block 2 are the same. When completing RSSI measurement on all actually sent synchronization signal blocks in a synchronization signal burst set, UE may separately send an RSSI value corresponding to each synchronization signal block to a network device, or send an average value of RSSIs corresponding to the synchronization signal blocks, that is, an RSSI corresponding to a cell, to the network device.

Figure 7B:
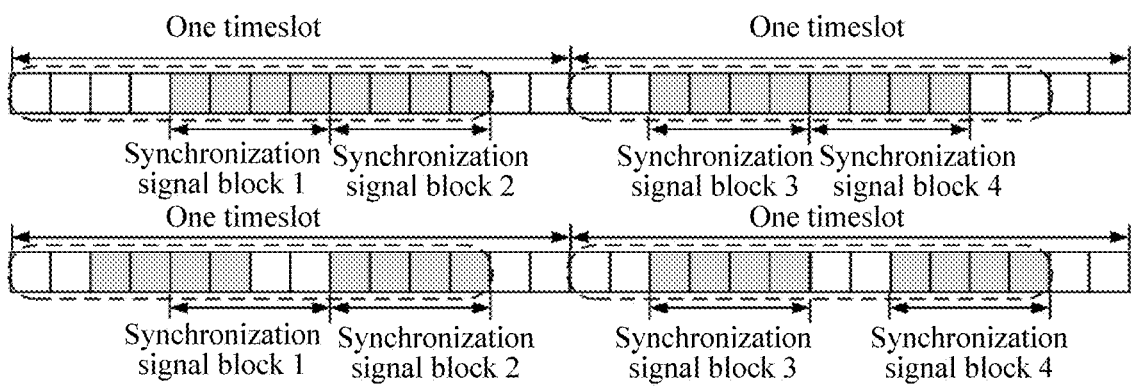

When the SCS=30 kHz, FIG. 7b is a schematic diagram of symbols that need to be measured for an RSSI corresponding to a synchronization signal block in two mapping manners. For a synchronization signal block 1 or 2, symbols that need to be measured for an RSSI corresponding to the synchronization signal block 1 or 2 are symbols in a first dashed line box. For a synchronization signal block 3 or 4, symbols that need to be measured for an RSSI corresponding to the synchronization signal block 3 or 4 are symbols in a second dashed line box (it is assumed that the last two symbols in each timeslot are uplink symbols). For details, refer to the descriptions of FIG. 7a, and details are not described herein again.

Figure 7C:
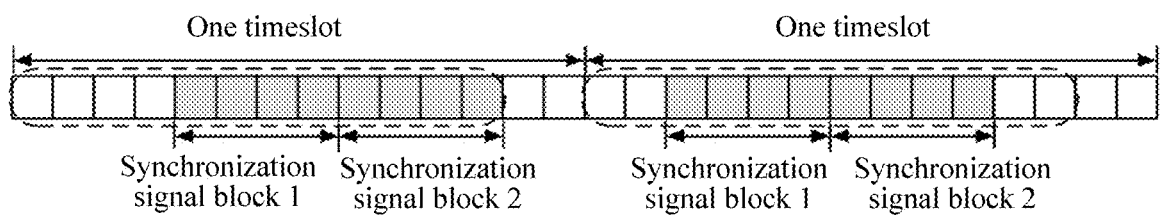

When the SCS=120 kHz, FIG. 7c is a schematic diagram of symbols that need to be measured for an RSSI corresponding to another synchronization signal block. For a synchronization signal block 1 or 2, symbols that need to be measured for an RSSI corresponding to the synchronization signal block 1 or 2 are symbols in a first dashed line box. For a synchronization signal block 3 or 4, symbols that need to be measured for an RSSI corresponding to the synchronization signal block 3 or 4 are symbols in a second dashed line box (it is assumed that the last two symbols in each timeslot are uplink symbols). For details, refer to the descriptions of FIG. 7a, and details are not described herein again.

Figure 8:
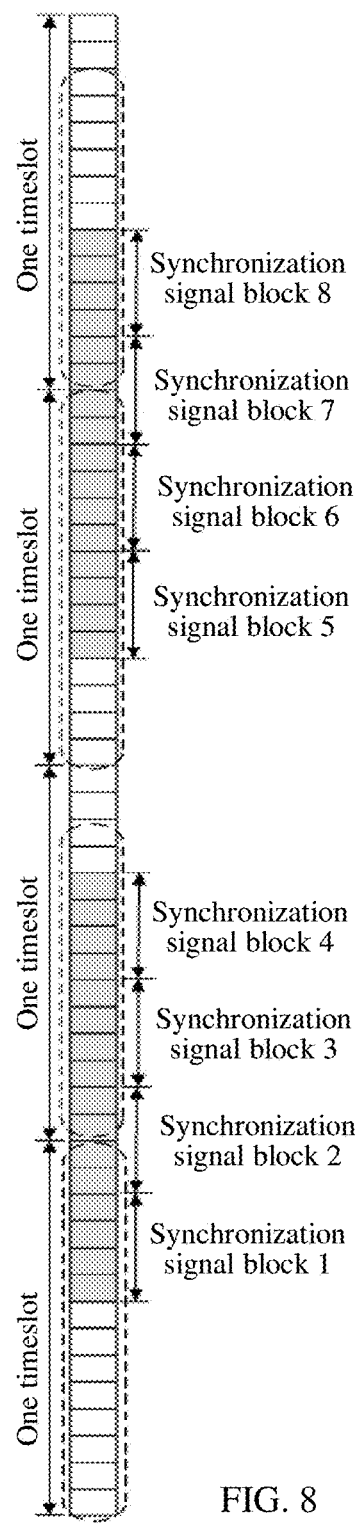
FIG. 8 is a schematic diagram of an example of symbols that need to be measured for an RSSI corresponding to another synchronization signal block.

In another implementation, the RSSI measurement configuration based on the timeslot is still considered. However, the time resource for performing the RSSI measurement includes first downlink symbols and second downlink symbols in two timeslots in which a synchronization signal block is located. For example, when the SCS=240 kHz, FIG. 8 is a schematic diagram of symbols that need to be measured for an RSSI corresponding to another synchronization signal block. For a synchronization signal block 1, symbols that need to be measured for an RSSI corresponding to the synchronization signal block 1 are symbols in a first dashed line box. For a synchronization signal block 2, because the synchronization signal block 2 crosses timeslots, symbols that need to be measured for a corresponding RSSI are symbols in the first dashed line box and a second dashed line box. For a synchronization signal block 3 or 4, symbols that need to be measured for an RSSI corresponding to the synchronization signal block 3 or 4 are symbols in the second dashed line box. This is also similar to synchronization signal blocks 5, 6, 7, and 8 (it is assumed that the last two symbols in a second timeslot and a fourth timeslot in the figure are uplink symbols). The terminal device obtains the RSSI corresponding to the synchronization signal block 1 by measuring a received signal power on the symbols in the first dashed line box, obtains the RSSI corresponding to the synchronization signal block 2 by measuring a received signal power on the symbols in the first dashed line box and the second dashed line box, and separately obtains RSSIs corresponding to the synchronization signal blocks 3 and 4 by measuring a received signal power on the symbols in the second dashed line box. Herein, the RSSIs corresponding to the synchronization signal blocks 3 and 4 are the same, and the rest can be deduced by analogy.

In still another implementation, an RSSI measurement configuration based on a symbol is considered. Specifically, the time resource for performing the RSSI measurement includes first downlink symbols in which a synchronization signal block is located and second downlink symbols corresponding to the synchronization signal block. Specifically, symbols that need to be measured for an RSSI corresponding to each synchronization signal block include not only symbols in which the synchronization signal block is located but also one or more symbols other than the symbols in which the synchronization signal block is located, and each synchronization signal block may be configured by using the one or more symbols other than the symbols in which the synchronization signal block is located.

Figure 9A:
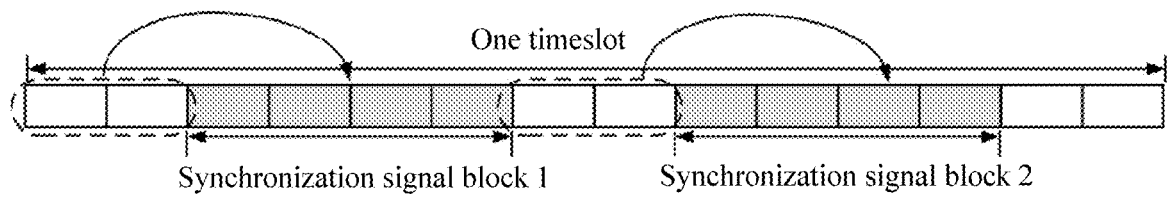
FIG. 9a to FIG. 9d are schematic diagrams of examples of symbols that need to be measured for an RSSI corresponding to still another synchronization signal block at different subcarrier spaces.

For example, when the SCS=15 kHz, FIG. 9a is a schematic diagram of symbols that need to be measured for an RSSI corresponding to another synchronization signal block. For a synchronization signal block 1, symbols that need to be measured for an RSSI corresponding to the synchronization signal block 1 include not only four symbols in which the synchronization signal block 1 is located but also symbols in a first dashed line box. For a synchronization signal block 2, symbols that need to be measured for an RSSI corresponding to the synchronization signal block 2 include not only four symbols in which the synchronization signal block 2 is located but also symbols in a second dashed line box (it is assumed that the last two symbols in the timeslot are uplink symbols). The terminal device obtains the RSSI of the synchronization signal block 1 by measuring a received signal power on the symbols corresponding to the synchronization signal block 1 and the symbols in the first dashed line box, and obtains the RSSI of the synchronization signal block 2 by measuring a received signal power on the symbols corresponding to the synchronization signal block 2 and the symbols in the second dashed line box. When completing RSSI measurement on all actually sent synchronization signal blocks in a synchronization signal burst set, UE may separately send an RSSI value corresponding to each synchronization signal block to a network device, or send an average value of RSSIs corresponding to the synchronization signal blocks, that is, an RSSI corresponding to a cell, to the network device.

Figure 9B:
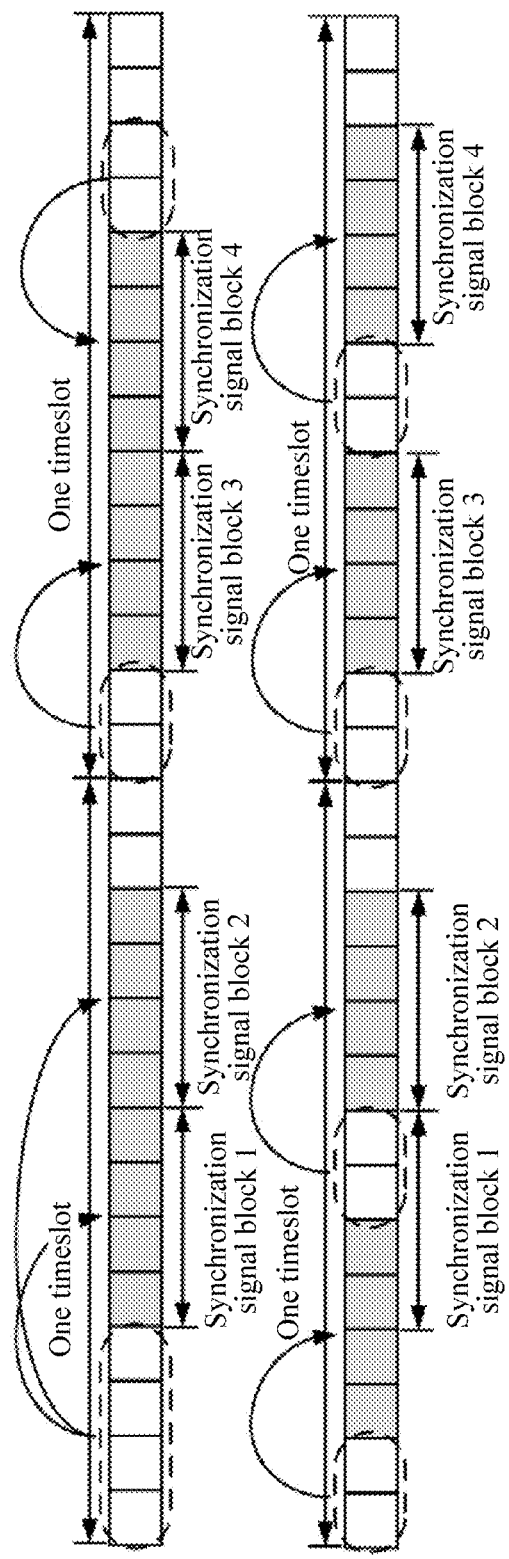

When the SCS=30 kHz, FIG. 9b is a schematic diagram of symbols that need to be measured for an RSSI corresponding to another synchronization signal block. For a first mapping mode, symbols that need to be measured for an RSSI corresponding to a synchronization signal block 1 or 2 include not only four symbols in which the synchronization signal block is located but also symbols in a first dashed line box, symbols that need to be measured for an RSSI corresponding to a synchronization signal block 3 include not only four symbols in which the synchronization signal block is located but also symbols in a second dashed line box, and symbols that need to be measured for an RSSI corresponding to a synchronization signal block 4 include not only four symbols in which the synchronization signal block is located but also symbols in a third dashed line box. This is similar to a second mapping mode. (It is assumed that the last two symbols in each timeslot are uplink symbols). For details, refer to the descriptions of FIG. 9a, and details are not described herein again.

Figure 9C:
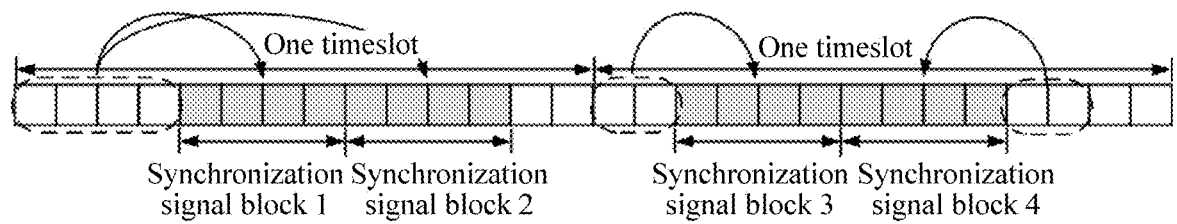

When the SCS=120 kHz, FIG. 9c is a schematic diagram of symbols that need to be measured for an RSSI corresponding to another synchronization signal block. For a synchronization signal block 1, symbols that need to be measured for an RSSI corresponding to the synchronization signal block 1 includes not only four symbols in which the synchronization signal block 1 is located but also symbols in a first dashed line box. For a synchronization signal block 2, symbols that need to be measured for an RSSI corresponding to the synchronization signal block 2 include not only four symbols in which the synchronization signal block 2 is located but also symbols in the first dashed line box. That is, second downlink symbols corresponding to the synchronization signal blocks 1 and 2 are the same. For a synchronization signal block 3, symbols that need to be measured for an RSSI corresponding to the synchronization signal block 3 include not only four symbols in which the synchronization signal block 3 is located but also symbols in a second dashed line box. For a synchronization signal block 4, symbols that need to be measured for an RSSI corresponding to the synchronization signal block 4 include not only four symbols in which the synchronization signal block 4 is located but also symbols in a third dashed line box. It is assumed that the last two symbols in each timeslot are uplink symbols. Second downlink symbols corresponding to the synchronization signal blocks 3 and 4 are different. For details, refer to the descriptions of FIG. 9a, and details are not described herein again.

Figure 9D:
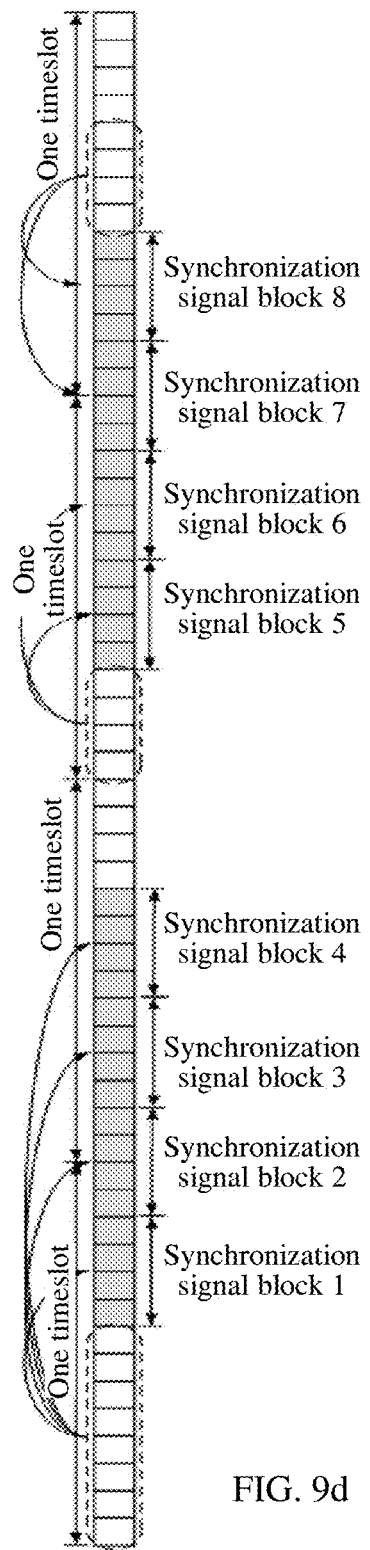

When the SCS=240 kHz, FIG. 9d is a schematic diagram of symbols that need to be measured for an RSSI corresponding to another synchronization signal block. It is assumed that the last four symbols in the second timeslot and the fourth timeslot are uplink symbols. Similarly, for synchronization signal blocks 1, 2, 3, and 4, symbols that need to be measured for RSSIs corresponding to the synchronization signal blocks 1, 2, 3, and 4 include not only four symbols in which each of the synchronization signal blocks 1, 2, 3, and 4 is located but also symbols in a first dashed line box. For synchronization signal blocks 5 and 6, symbols that need to be measured for RSSIs corresponding to the synchronization signal block 5 and 6 include not only four symbols in which each of the synchronization signal block 5 and 6 is located but also symbols in a second dashed line box. For synchronization signal blocks 7 and 8, symbols that need to be measured for RSSIs corresponding to the synchronization signal block 7 and 8 include not only four symbols in which each of the synchronization signal block 7 and 8 is located but also symbols in a third dashed line box. For details, refer to the descriptions of FIG. 9a, and details are not described herein again.

It can be learned from FIG. 9a to FIG. 9d that the first downlink symbols and the second downlink symbols are located in a same timeslot or different timeslots. Second downlink symbols corresponding to synchronization signal blocks are the same or different. Specifically, the first downlink symbols and the second downlink symbols may be preset by the network device.

Further, after the RSSI is obtained through measurement, the terminal device may obtain reference signal received quality (reference signal received quality, RSRQ) through calculation based on the following formula:

$$RSRQ = \frac{N \cdot a \cdot RSRP}{RSSI} \qquad \text{Formula (1)}$$

where N is a quantity of resource blocks included in a frequency resource for the RSSI measurement, a is a preset coefficient or a is a value used to adjust relative weights of an RSRP and the RSSI, a value of a may be 1 by default or may be set to another value by the network device, and a may be carried in the measurement configuration message.

The reference signal received power (reference signal received power, RSRP) is a value reflecting a reference signal received power of the terminal device. In an NR system, the terminal device obtains the RSRP by measuring a power of an SSS in the synchronization signal block, and the terminal device may select, by itself, whether to obtain the RSRP based on a demodulation reference signal (demodulation reference signal, DMRS) in a PBCH.

In the formula for calculating the RSRQ, the RSRP is an average value of measured RSRPs of first downlink symbols and/or second downlink symbols in which a maximum of L synchronization signal blocks are located, and the RSSI is an average value of measured received signal powers of the first downlink symbols and/or the second downlink symbols in which the maximum of L synchronization signal blocks are located. For a synchronization signal block, if an RSRP measured by the terminal device is less than a first threshold, the terminal device may remove an RSSI obtained by measuring downlink symbols in a timeslot in which the synchronization signal block is located or may directly not measure the downlink symbols in the timeslot in which the synchronization signal block is located. That is, if a reference signal received power RSRP of a synchronization signal block is greater than or equal to the first threshold, the terminal device measures a received signal power on first downlink symbols and/or a received signal power on second downlink symbols, that is, the terminal device measures the received signal power on the first downlink symbols and/or the second downlink symbols that corresponds to the synchronization signal block whose RSRP is greater than or equal to the first threshold. The first threshold may be a default value or set by the network device.

In addition, there may further be another RSSI measurement configuration manner. For example, a measurement manner is measuring only symbols in which a synchronization signal block is located, or another measurement configuration manner is measuring one or more timeslots in a 5 millisecond time window. Therefore, the RSSI measurement configuration message may further indicate another RSSI measurement configuration manner.

The network device may notify the terminal device of the foregoing RSSI measurement configuration manner by using a system message or a broadcast message. For the terminal device in a connected state, the network device may notify the terminal device by using RRC signaling.

For the another measurement configuration manner of measuring one or more timeslots in a 5 millisecond time window, the network device may configure an RSSI measurement time window in a 5 millisecond time window in which a synchronization signal burst set is located. A start point of the time window may be a first symbol in a timeslot in which a first actually sent synchronization signal block is located or a first symbol of the first actually sent synchronization signal block, and a length of the time window may be a preset default value or may be configured by the network device, or a start point of the time window may be a first symbol in a timeslot in which a first synchronization signal block in a synchronization signal burst set is located or a first symbol of a first actually sent synchronization signal block, and a length of the time window may be a preset default value or configured by the network device. The network device may alternatively directly indicate the one or more timeslots in the 5 millisecond time window that need to be measured for the RSSI.

According to an RSSI measurement method provided in the embodiments of the present invention, a received signal power on the downlink symbols in which the synchronization signal block is located and/or a received signal power on other several downlink symbols is measured by using a transmit beam for each synchronization signal block, thereby reducing complexity and power overheads of the measurement performed by the terminal device while considering precision of the RSSI measurement.

The methods in the embodiments of the present invention are described above in detail, and apparatuses in embodiments of the present invention are provided below.

In the embodiments of this application, function modules of the terminal device or the network device may be divided based on the foregoing method examples. For example, function modules may be divided corresponding to functions, or two or more functions may be integrated into one processing module. The integrated module may be implemented in a form of hardware, or may be implemented in a form of a software function module. It should be noted that module division in the embodiments of this application is an example and is merely logical function division. During actual implementation, there may be another division manner. The following descriptions are made by using an example in which function modules are divided corresponding to functions.

Figure 10:
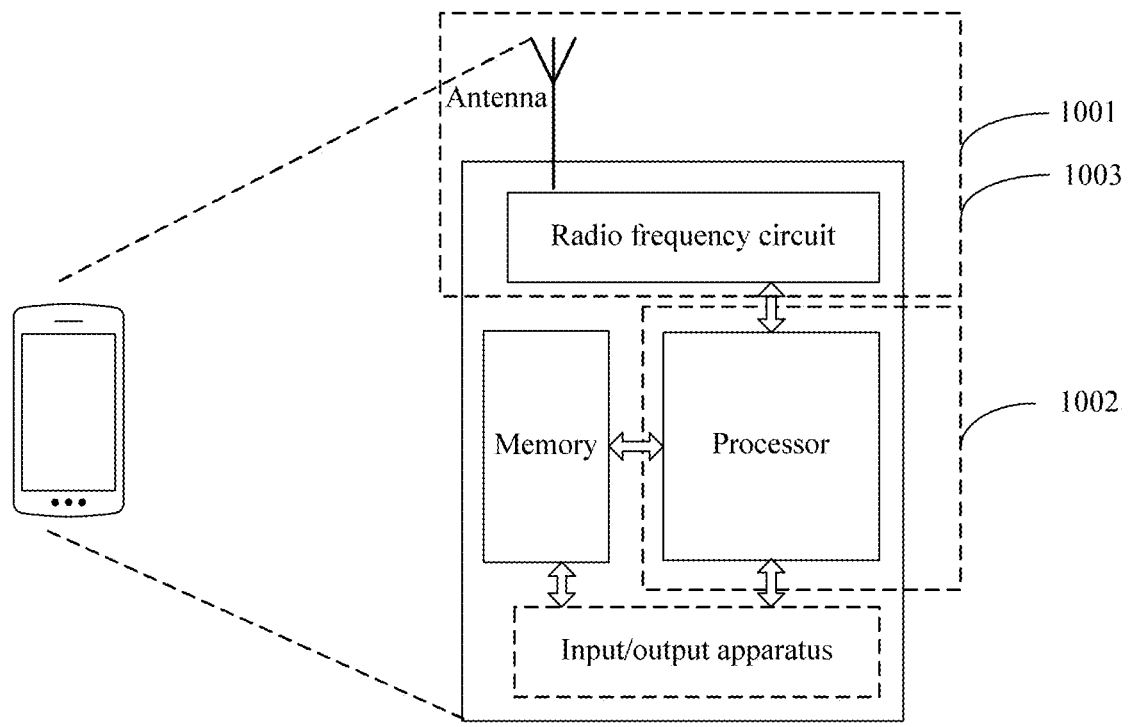
FIG. 10 is a schematic structural diagram of an example of a terminal device.

FIG. 10 is a schematic structural diagram of a simplified terminal device. For ease of understanding and convenience of figure illustration, an example in which a terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that terminal devices of some types may not have the input/output apparatus.

When needing to send data, after performing baseband processing on to-be-sent data, the processor outputs a baseband signal to the radio frequency circuit, and the radio frequency circuit performs radio frequency processing on the baseband signal and sends the radio frequency signal to outside in a form of an electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data. For ease of description, FIG. 10 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a receiving and sending function may be considered as a receiving unit and a sending unit of the terminal device (or may be collectively referred to as a transceiver unit), and the processor having a processing function may be considered as a processing unit of the terminal device. As shown in FIG. 10, the terminal device includes a receiving unit 1001, a processing unit 1002, and a sending unit 1003. The receiving unit 1001 may also be referred to as a receiver machine, a receiver, a receiver circuit, and the like. The sending unit 1003 may also be referred to as a sending machine, a transmitter machine, a transmitter, a transmitter circuit, and the like. The processing unit may also be referred to as a processor, a processing board, a processing module, a processing apparatus, and the like.

For example, in an embodiment, the receiving unit 1001 is configured to perform step S201 and step S202 in the embodiment shown in FIG. 2, and the processing unit 1002 is configured to perform step S203 in the embodiment shown in FIG. 2.

For another example, in another embodiment, the processing unit 1002 is further configured to perform the step of calculating the RSRQ.

Figure 11:
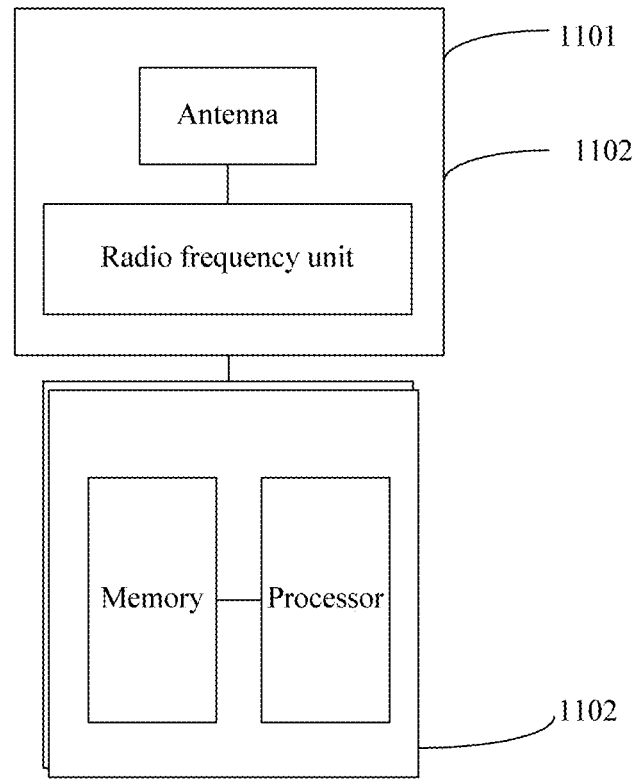
FIG. 11 is a schematic structural diagram of an example of a network device.

FIG. 11 is a schematic structural diagram of a simplified network device. A network device includes a radio frequency signal receiving and sending and conversion part and a 1102 part, and the radio frequency signal receiving and sending and conversion part further includes a receiving unit 1101 part and a sending unit 1103 part (which are also collectively referred to as a transceiver unit). The radio frequency signal receiving and sending and conversion part is mainly configured to: perform radio frequency signal receiving and sending and perform conversion between a radio frequency signal and a baseband signal. The 1102 part is mainly configured to: perform baseband processing, control the network device, and the like. The receiving unit 1101 may also be referred to as a receiver machine, a receiver, a receiver circuit, and the like. The sending unit 1103 may also be referred to as a sending machine, a transmitter machine, a transmitter, a transmitter circuit, and the like. The 1102 part is usually a control center of the network device, or may be usually referred to as a processing unit, configured to control the network device to perform the steps performed by a second communications apparatus in FIG. 5 or FIG. 9. For details, refer to the foregoing descriptions of the related part.

The 1102 part may include one or more boards. Each board may include one or more processors and one or more memories, and the processor is configured to read and execute a program in the memory, to implement a baseband processing function and control the network device. If there are a plurality of boards, the boards may be interconnected to enhance a processing capability. In an optional implementation, alternatively, the plurality of boards may share one or more processors, or the plurality of boards share one or more memories, or the plurality of boards share one or more processors at the same time.

For example, in an embodiment, the sending unit 1103 is configured to perform step S201 and step S202 in FIG. 2.

In another optional implementation, with development of system on chip (SoC) technologies, some or all of functions of the 1102 part and the 1101 part may be implemented by using the SoC technology such as a base station function chip. The base station function chip is integrated with devices such as a processor, a memory, and an antenna interface, a program of a base station-related function is stored in the memory, and the program is executed by the processor to implement the base station-related function. Optionally, the base station function chip can further read a memory outside the chip to implement the base station-related function.

An embodiment of the present invention further provides a processor. The processor includes at least one circuit, configured to: control a transmitter to send a synchronization signal block, and control the transmitter to send a received signal strength indicator RSSI measurement configuration message, where the measurement configuration message includes indication information of a time resource for RSSI measurement, and the time resource includes first downlink symbols and/or second downlink symbols in a timeslot in which the synchronization signal block is located, the first downlink symbols include downlink symbols in which the synchronization signal block is located, and the second downlink symbols include at least one downlink symbol other than the first downlink symbols.

An embodiment of the present invention further provides a processor. The processor includes at least one circuit, configured to: control a receiver to receive a received signal strength indicator RSSI measurement configuration message, where the measurement configuration message includes indication information of a time resource for RSSI measurement, and the time resource includes first downlink symbols and/or second downlink symbols in a timeslot in which a synchronization signal block is located, and control the receiver to receive the synchronization signal block, where the at least one circuit is configured to measure a received signal power on the first downlink symbols and/or the second downlink symbols, the first downlink symbols include downlink symbols in which the synchronization signal block is located, and the second downlink symbols include at least one downlink symbol other than the first downlink symbols.

An embodiment of the present invention further provides a computer-readable storage medium. The computer-readable storage medium stores an instruction, and when the instruction is run on a computer, the computer is enabled to perform the method according to the foregoing aspects.

An embodiment of the present invention further provides a computer program product including an instruction, and when the computer program product is run on a computer, the computer is enabled to perform the method according to the foregoing aspects.

For explanations and beneficial effects of related content in any of the foregoing provided communications apparatuses, refer to corresponding method embodiments provided above, and details are not described herein again. A person of ordinary skill in the art may be aware that, in combination with the examples described in the embodiments disclosed in this specification, units and algorithm steps may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on the computer, all or some of the procedures or functions according to the embodiments of the present invention are generated. The computer may be a general-purpose computer, a dedicated computer, a computer network, or other programmable apparatuses. The computer instruction may be stored in a computer-readable storage medium, or transmitted by using the computer-readable storage medium. The computer instruction may be transmitted from a website, computer, server, or data center to another website, computer, server, or data center in a wired (for example, by using a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes: any medium that can store program code, such as a read-only memory (ROM), a random access memory (RAM), a magnetic disk, or an optical disc.

What is claimed is:

1. A received signal strength indicator (RSSI) measurement method, comprising:
   sending, by a network device, one or more synchronization signal blocks (SS blocks), each of the one or more SS blocks comprises a primary synchronization signal (PSS), a secondary synchronization signal (SSS) and a physical broadcast channel (PBCH); and
   sending, by the network device, to a terminal device, an RSSI measurement configuration message, wherein the measurement configuration message comprises indication information of a time resource for RSSI measurement, and wherein the time resource comprises downlink symbols in a timeslot in which the one or more SS blocks actually sent by the network device are located;
   wherein the indication information indicates that, within the timeslot, the time resource for RSSI measurement comprises only the first to sixth downlink symbols, and wherein the one or more SS blocks comprise one SS block located at the third to sixth downlink symbols, or,
   wherein the indication information indicates that, within the timeslot, the time resource for RSSI measurement comprises only the first to eighth downlink symbols, and wherein the one or more SS blocks comprise one SS block located at the fifth to eighth downlink symbols, or,
   wherein the indication information indicates that, within the timeslot, the time resource for RSSI measurement comprises only the first to twelfth downlink symbols, and wherein the one or more SS blocks comprise two SS blocks located at the fifth to twelfth downlink symbols.

2. The method according to claim 1, wherein the sending the RSSI measurement configuration message causes the terminal device to perform the RSSI measurement according to the measurement configuration message.

3. A received signal strength indicator (RSSI) measurement method, comprising:
   receiving, by a terminal device, an RSSI measurement configuration message from a network device, wherein the measurement configuration message comprises indication information of a time resource for RSSI measurement, and the time resource comprises downlink symbols in a timeslot in which one or more synchronization signal blocks (SS blocks) actually sent by the network device are located; and
   measuring, by the terminal device, a received signal power on the downlink symbols based on the indication information;
   wherein the indication information indicates that, within the timeslot, the time resource for RSSI measurement comprises only the first to sixth downlink symbols, and wherein the one or more SS blocks comprise one SS block located at the third to sixth downlink symbols, or,
   wherein the indication information indicates that, within the timeslot, the time resource for RSSI measurement comprises only the first to eighth downlink symbols, and wherein the one or more SS blocks comprise one SS block located at the fifth to eighth downlink symbols, or,
   wherein the indication information indicates that, within the timeslot, the time resource for RSSI measurement comprises only the first to twelfth downlink symbols, and wherein the one or more SS blocks comprise two SS blocks located at the fifth to twelfth downlink symbols.

4. The method according to claim 3, wherein the measuring, by the terminal device, a received signal power on the downlink symbols in the timeslot, comprises:
   measuring, by the terminal device, a total received power on the downlink symbols in the timeslot; and
   averaging the total received power.

5. A network device, comprising:
   a transmitter;
   a processor connected to the transmitter; and
   a non-transitory computer-readable storage medium storing a program to be executed by the processor, the program including instructions to:
   cause the transmitter to send one or more synchronization signal blocks (SS blocks), each of the one or more SS blocks comprises a primary synchronization signal (PSS), a secondary synchronization signal (SSS) and a physical broadcast channel (PBCH); and
   cause the transmitter to send a received signal strength indicator (RSSI) measurement configuration message to a terminal device, wherein the measurement configuration message comprises indication information of a time resource for RSSI measurement, and wherein the time resource comprises downlink symbols in a timeslot in which the one or more SS Blocks are located;
   wherein the indication information indicates that, within the timeslot, the time resource for RSSI measurement comprises only the first to sixth downlink symbols, and wherein the one or more SS blocks comprise one SS block located at the third to sixth downlink symbols, or,
   wherein the indication information indicates that, within the timeslot, the time resource for RSSI measurement comprises only the first to eighth downlink symbols, and wherein the one or more SS blocks comprise one SS block located at the fifth to eighth downlink symbols, or,
   wherein the indication information indicates that, within the timeslot, the time resource for RSSI measurement comprises only the first to twelfth downlink symbols, and wherein the one or more SS blocks comprise two SS blocks located at the fifth to twelfth downlink symbols.

6. The network device according to claim 5, wherein sending the RSSI measurement configuration message causes the terminal device to perform the RSSI measurement according to the measurement configuration message.

7. A terminal device, comprising:
a receiver;
a processor; and
a non-transitory computer-readable storage medium storing a program to be executed by the processor, the program including instructions to:
receive, through the receiver, a received signal strength indicator (RSSI) measurement configuration message through the receiver from a network device, wherein the measurement configuration message comprises indication information of a time resource for RSSI measurement, and the time resource comprises downlink symbols in a timeslot in which one or more synchronization signal blocks (SS blocks) actually sent by the network device are located; and
measure a received signal power on the downlink symbols based on the indication information;
wherein the indication information indicates that, within the timeslot, the time resource for RSSI measurement comprises only the first to sixth downlink symbols, and wherein the one or more SS blocks comprise one SS block located at the third to sixth downlink symbols, or,
wherein the indication information indicates that, within the timeslot, the time resource for RSSI measurement comprises only the first to eighth downlink symbols, and wherein the one or more SS blocks comprise one SS block located at the fifth to eighth downlink symbols, or,
wherein the indication information indicates that, within the timeslot, the time resource for RSSI measurement comprises only the first to twelfth downlink symbols, and wherein the one or more SS blocks comprise two SS blocks located at the fifth to twelfth downlink symbols.

8. The terminal device according to claim 7, wherein the non-transitory computer-readable storage medium storing a program to be executed by the processor, the program including instructions to:
measure a total received power on the downlink symbols in the timeslot; and
average the total received power.

\* \* \* \* \*